(12) United States Patent
Linford et al.

(10) Patent No.: US 8,846,161 B2
(45) Date of Patent: Sep. 30, 2014

(54) HYDROPHOBIC COATING AND METHOD

(75) Inventors: Matthew R. Linford, Orem, UT (US);
Gaurav Saini, Provo, UT (US)

(73) Assignee: Brigham Young University, Provo, UT (US)

( * ) Notice: Subject to any disclaimer, the term of this patent is extended or adjusted under 35 U.S.C. 154(b) by 634 days.

(21) Appl. No.: 12/837,929

(22) Filed: Jul. 16, 2010

(65) Prior Publication Data

US 2011/0159299 A1 Jun. 30, 2011

Related U.S. Application Data

(63) Continuation-in-part of application No. 11/866,897, filed on Oct. 3, 2007.

(60) Provisional application No. 60/849,233, filed on Oct. 3, 2006.

(51) Int. Cl.
| | | |
|---|---|---|
| *H05H 1/00* | (2006.01) | |
| *C09D 183/06* | (2006.01) | |
| *B82Y 30/00* | (2011.01) | |
| *B05D 1/00* | (2006.01) | |
| *D06M 10/02* | (2006.01) | |
| *D06M 13/513* | (2006.01) | |
| *D06M 19/00* | (2006.01) | |
| *B05D 1/36* | (2006.01) | |
| *C09D 5/00* | (2006.01) | |
| *D06M 13/507* | (2006.01) | |
| *B05D 3/14* | (2006.01) | |
| *C08K 5/5455* | (2006.01) | |
| *B05D 3/06* | (2006.01) | |
| *B05D 5/08* | (2006.01) | |

(52) U.S. Cl.
CPC ............. *B82Y 30/00* (2013.01); *B05D 3/144* (2013.01); *C09D 183/06* (2013.01); *B05D 1/60* (2013.01); *D06M 2200/12* (2013.01); *D06M 10/025* (2013.01); *C08K 5/5455* (2013.01); *D06M 13/513* (2013.01); *D06M 19/00* (2013.01); *B05D 3/062* (2013.01); *B05D 1/36* (2013.01); *B05D 5/08* (2013.01); *C09D 5/002* (2013.01); *D06M 13/507* (2013.01)
USPC ............................ 427/536; 427/535; 427/539

(58) Field of Classification Search
USPC ........... 428/428, 429, 451; 427/536, 539, 535
See application file for complete search history.

(56) References Cited

U.S. PATENT DOCUMENTS

| 3,660,165 A | 5/1972 | Palmer |
| 3,899,354 A | 8/1975 | Kordesch |

(Continued)

FOREIGN PATENT DOCUMENTS

WO WO2008025355 A1 3/2008

OTHER PUBLICATIONS

Howarter et al, Surface Modification of Polymers with 3-Aminopropyltriethoxysilane as General Pretreatment for Controlled Wettability, 2007, Macromolecules, 40, p. 1128-1132.*

(Continued)

*Primary Examiner* — Dah-Wei D Yuan
*Assistant Examiner* — Vera V Law
(74) *Attorney, Agent, or Firm* — James Sonntag

(57) ABSTRACT

A hydrophobic coating and method of preparing a hydrophobic coating with an adhesion promoting layer formed from an adhesion promoting composition and a hydrophobic layer, is disclosed. The adhesion promoting composition may comprise an adhesion promoting compound having an amine group and at least one of a silane functional group and/or a germanium functional group. The hydrophobic layer forming composition may comprise a hydrophobic layer forming compound having a hydrophobic aliphatic group and at least one of a silane functional group and/or a germanium functional group.

1 Claim, 6 Drawing Sheets

(56) References Cited

U.S. PATENT DOCUMENTS

| | | |
|---|---|---|
| 3,963,881 A | 6/1976 | Fraim |
| 4,292,681 A | 9/1981 | Kloss |
| 4,362,164 A | 12/1982 | Little |
| 4,731,311 A | 3/1988 | Suzuki |
| 4,826,741 A | 5/1989 | Aldhart |
| 4,977,043 A | 12/1990 | Kadouchi |
| 4,987,597 A | 1/1991 | Haerti |
| 5,187,746 A | 2/1993 | Narisawa |
| 5,222,050 A | 6/1993 | Marren |
| 5,259,032 A | 11/1993 | Perkins |
| 5,277,694 A | 1/1994 | Leysieffer |
| 5,282,245 A | 1/1994 | Anderson |
| 5,476,717 A * | 12/1995 | Floch ............................ 428/421 |
| 5,530,763 A | 6/1996 | Aebi |
| 5,635,246 A * | 6/1997 | Ogawa et al. ................. 427/341 |
| 5,639,569 A | 6/1997 | Kohler |
| 5,759,712 A | 6/1998 | Hockaday |
| 5,798,189 A | 8/1998 | Hayashida |
| 6,058,198 A | 5/2000 | Aceti |
| 6,069,963 A | 5/2000 | Martin |
| 6,105,713 A | 8/2000 | Brimhall |
| 6,117,579 A | 9/2000 | Gyoten |
| 6,127,061 A | 10/2000 | Shun |
| 6,134,333 A | 10/2000 | Flagler |
| 6,135,235 A | 10/2000 | Brimhall |
| 6,177,482 B1 | 1/2001 | Cinelli |
| 6,258,454 B1 | 7/2001 | Lefkowitz |
| 6,389,143 B1 | 5/2002 | Leedom |
| 6,479,595 B1 * | 11/2002 | Zhang et al. .................. 525/344 |
| 6,512,834 B1 | 1/2003 | Banter |
| 6,517,967 B1 | 2/2003 | Shrim |
| 6,546,110 B1 | 4/2003 | Vonlanthen |
| 6,567,527 B1 | 5/2003 | Baker |
| 6,574,343 B1 | 6/2003 | Meier |
| 6,605,379 B1 | 8/2003 | Mercuri |
| 6,751,327 B1 | 6/2004 | Urso |
| 7,010,340 B2 | 3/2006 | Scarantino |
| 7,166,010 B2 | 1/2007 | Lamansky |
| 2001/0043708 A1 | 11/2001 | Brimhall |
| 2001/0049051 A1 | 12/2001 | Jones |
| 2002/0102004 A1 | 8/2002 | Minervini |
| 2002/0192385 A1 * | 12/2002 | Jenkner et al. ................ 427/387 |
| 2002/0192545 A1 | 12/2002 | Ramaswami |
| 2002/0196948 A1 | 12/2002 | Silverman |
| 2003/0025234 A1 | 2/2003 | Gough |
| 2003/0039748 A1 | 2/2003 | Valint |
| 2003/0047459 A1 | 3/2003 | Timonov |
| 2003/0054226 A1 | 3/2003 | Kaneko |
| 2003/0059664 A1 | 3/2003 | Menjak |
| 2003/0068544 A1 | 4/2003 | Cisar |
| 2003/0076970 A1 | 4/2003 | Van Halteren |
| 2003/0091891 A1 | 5/2003 | Yoshida |
| 2003/0194557 A1 | 10/2003 | Wilde |
| 2003/0219645 A1 | 11/2003 | Reichert |
| 2003/0219650 A1 | 11/2003 | Saruwatari |
| 2003/0228522 A1 | 12/2003 | Yang |
| 2004/0023287 A1 | 2/2004 | Harnack |
| 2004/0038808 A1 | 2/2004 | Hampden Smith |
| 2004/0064072 A1 | 4/2004 | Shapira |
| 2004/0137311 A1 | 7/2004 | Mathias |
| 2004/0146772 A1 | 7/2004 | Miyao |
| 2004/0157101 A1 | 8/2004 | Smedley |
| 2004/0161445 A1 | 8/2004 | Bulk |
| 2004/0166397 A1 | 8/2004 | Valdez |
| 2004/0179709 A1 | 9/2004 | Niederdraenk |
| 2004/0209136 A1 | 10/2004 | Ren |
| 2004/0209153 A1 | 10/2004 | Peted |
| 2004/0229107 A1 | 11/2004 | Smedley |
| 2004/0241537 A1 | 12/2004 | Okuyama |
| 2005/0002539 A1 | 1/2005 | Nielsen |
| 2005/0019639 A1 | 1/2005 | Nakakubo |
| 2005/0077102 A1 | 4/2005 | Banter |
| 2005/0100778 A1 | 5/2005 | Shimizu |
| 2005/0141738 A1 | 6/2005 | Karamuk |
| 2005/0147868 A1 | 7/2005 | Taleda |
| 2005/0148996 A1 | 7/2005 | Sun |
| 2005/0152568 A1 | 7/2005 | Roeck |
| 2005/0190938 A1 | 9/2005 | Shennib |
| 2005/0249369 A1 | 11/2005 | Angst |
| 2005/0255373 A1 | 11/2005 | Kimura |
| 2006/0050914 A1 | 3/2006 | Urso |
| 2006/0105227 A1 | 5/2006 | Kim |
| 2006/0127734 A1 | 6/2006 | McLean |
| 2006/0141314 A1 | 6/2006 | Kim |
| 2006/0147776 A1 | 7/2006 | Sarata |
| 2006/0204814 A1 | 9/2006 | Sekino |
| 2006/0215862 A1 | 9/2006 | Huynh |
| 2006/0215864 A1 | 9/2006 | Espersen |
| 2006/0228606 A1 | 10/2006 | Fiebig |
| 2006/0257715 A1 | 11/2006 | Ueda |
| 2006/0292412 A1 | 12/2006 | Faghri |
| 2006/0292434 A1 | 12/2006 | Hampden Smith |
| 2007/0003081 A1 | 1/2007 | Ram |
| 2007/0003084 A1 | 1/2007 | Huynh |
| 2007/0003087 A1 | 1/2007 | Ram |
| 2007/0009106 A1 | 1/2007 | Tilson |
| 2007/0020500 A1 | 1/2007 | Kanaoka |
| 2007/0037040 A1 | 2/2007 | Koyama |
| 2007/0045106 A1 | 3/2007 | Yang |
| 2007/0141365 A1 | 6/2007 | Jelle |
| 2008/0240479 A1 | 10/2008 | Linford |

OTHER PUBLICATIONS

U.S. Appl. No. 10/749,291, filed Jun. 30, 2005, Karamuk.
Kanan, Langmuir 2002, 18, 6623-6627.
Hoffman, Langmuir 1997, 13, 1877-1880.
Pallandre, Nano Letters 2004, 365-371.
EK, Langmuir 2003, 19, 10601-10609.
CECCHET, Langmuir 2006, 22, 1173-1181.
CAI, Langmuir 2000, 16, 3446-3453.
Montanari, Phys. Chem. B 2005, 109, 879-883.
Hansma, Nucl. Acids Res. 1996, 24, 713.
Howarter, Macromolecules 2007, 40, 1128-1132.
Kasai, Vac. Sci. Technol. B. 2005, 23, 995-1003.
Pellerite, Phys. Chem. B. 2002, 106, 4746-4754.
Pompe, Langmuir 1999, 15, 2398, 2401.
Krass, Chemistry of Materials 2003, 15, 196-203.
Huang, Langmuir 2002, 18, 220-230.
James, Langmuir 1998, 14, 741-744.
Duffy, Analytical Chemistry 1988, 70, 4974-4984.
White, Colloid Interface Sci. 2000, 232, 400.
PowerOne; Cell Specification; Sealed Rechargeable Ni-MH Button Cell; 4, Apr. 2007.

* cited by examiner

Wetting test parameters:
"Water Repellency: DuPont Water Drop Test"
LS & CO METHOD 42
Modified : Grading example below 4 = Passes; clear well-rounded drop
3 = Borderline pass; rounding drop with partial darkening
2 = Fails; wicking apparent and/or complete wetting
1 = Fails; complete wetting

Figure 5

Spray Test Rating Chart

Spray test parameters:
"Water Repellency: Spray Test"
AATCC Test Method 22-2005

STANDARD SPRAY TEST RATINGS

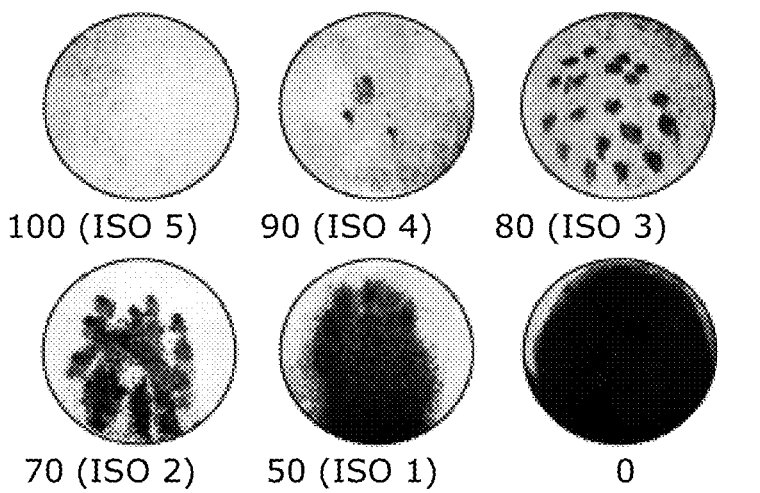

100 (ISO 5)   90 (ISO 4)   80 (ISO 3)

70 (ISO 2)   50 (ISO 1)   0

100-NO STICKING OR WETTING OF THE SPECIMEN FACE
90-SLIGHT RANDOM STICKING OR WETTING FOF THE SPECIMEN FACE
80-WETTING OF SPECIMEN FACE AT SPRAY POINTS
70-PARTIAL WETTING OF THE SPECIMEN FACE BEYOND THE SPRAY POINTS
50-COMPLETE WETTING OF THE ENTIRE SPECIMEN FACE BEYOND THE SPRAY POINTS
0- COMPLETE WETTING OF THE ENTIRE FACE OF THE SPECIMEN

Summary: Due to the poor initial performance of the $O_2$/ICPTES and $CO_2$/ICPTES samples, they were not subjected to the wash test.

HYDROPHOBIC COATING AND METHOD

CROSS REFERENCE TO RELATED APPLICATIONS

This application is a continuation-in-part of U.S. patent application Ser. No. 11/866,897, filed Oct. 3, 2007, which claims priority from U.S. Provisional Patent Application 60/849,233, filed Oct. 3, 2006, which are hereby incorporated by reference.

BACKGROUND

Many polymer/plastic materials have desirable bulk properties such as low density, low cost, good strength, and ease of processing that have allowed them to become integral components of countless consumer goods and devices. However, many plastics that have ideal bulk properties for certain applications are lacking in their surface properties, such as, for example, abrasion resistance and wetting. As a result, it may be desirable to coat a polymer/plastic to modify its surface so that its favorable bulk properties can be exploited for various uses.

In many instances, various devices are designed to prevent water from entering interior portions of the devices in order to maintain proper functionality. Manufacturers often design devices to be used in environments where water or other liquid materials may come into contact with the devices and components of the devices. Devices and device components may have various protective coverings to protect interior portions of the devices and components. Often, the protective covering is made from multiple parts, resulting in various seams and openings that may expose interior portions to damage from liquids. Many devices also require small openings or interstices in the protective cover in order to allow air or other gases to flow freely between the interior and exterior of the device while preventing liquids from passing through the cover. For example, a battery used in powering an electronic device may be susceptible to damage from moisture, and may nonetheless require an external source of oxygen to operate. Additionally, devices may contain a liquid material that is intended to be contained within the device for an extended time until the liquid is dispensed. An ink jet cartridge, for example, often contains a liquid ink solution that is contained within the cartridge for extended periods.

SUMMARY

Effective hydrophobic coatings have been disclosed in U.S. patent application Ser. No. 11/866,897, filed Oct. 3, 2007. It has been found that on some surfaces, the effectiveness of the coating varies widely over the compositions disclosed.

An aspect of the invention involves treating a surface with an adhesion promoting compound or first silane or having at least one silane functional group and at least one amine group. The surface formed by the first silane is then treated with a second silane.

Another aspect of the invention is treatment of a surface with a plasma to add an increased number of carboxyl groups to the surface before treatment of the hydrolyzed first silane with the amine group. Without being limited by theory it is believed that the treatment of the surface with an appropriate plasma should create an increased number of carboxyl groups on the surface for binding to the first silane.

Another aspect of the invention is a reaction product of a surface, a hydrolyzed first silane with an amine group and a second silane.

Another aspect of the invention is an article of manufacture comprising an article of a surface, a hydrolyzed first silane with an amine group and a second silane.

Devices that may be treated by the present invention are any devices that may benefit having hydrophobic surfaces. These include, but are not limited to, (1) anti-wetting/anti-fogging optical surfaces such as windows, vehicle windshields, lenses, optical devices, computer/led screens, and the like (2) all fibers and textiles and anything made thereof, including but not limited to: apparel and other textile articles such as water-resistant outerwear (coats, jackets, liners, pants, gloves, footwear, socks, hats), stain resistant clothing, clothing (formal, casual, work, medical, athletic), carpeting & rugs, zipper fasteners, rope/cordage, camping equipment (tents, footprints, sleeping bags, sleeping pads, rain flies, screens, backpacks, dry bags, canopies), filters, upholstery, medical gowns, bedding (sheets, pillows, comforters, blankets, pillow cases, mattress pads, mattress covers, mattresses), Geotextiles, water sport apparel (swimming suits, wet suits, dry suits, Personal Flotation Devices, skull caps, booties, gloves), protective wear (chemical suites, bullet proof vests, firefighting apparel, helmets), and covers (pool covers, awnings, boat covers, protective covers)

(3) water/snow sports and vehicle applications such as boat hulls, flotation devices, water and snow skis and boards (4) surfaces exposed to weather that may benefit from water resistance such as building materials of any material, such as synthetic or natural polymers (vinyl, wood, etc.), metals, and the doors and exterior surfaces of vehicles, such as cars, trains, and airplane, particularly for watercraft, and aircraft. The coating may be useful on surfaces to mitigate accumulation of ice on aerodynamic or wing lifting surfaces and the like.

(5) electronic devices, including those that are routinely or may be accidentally exposed to water or humid conditions, such as hearing aids, cell phones, portable computers, audio and video devices, and cameras, (6) insulating materials such as feathers, hollow polymeric fibers, closed and open celled foam.

In general, any device where a hydrophobic surface may be applicable is contemplated; including those listed in the Background, and other suitable devices, such as, for example, electronic equipment (both portable and nonportable devices), medical devices (such as tools, implants, diagnostic equipment, catheters), batteries, and fishing articles (lures, lines).

Coating may be formed on portions of completed article assemblies, article sub-assemblies, individual articles, device components, and/or shell components. Coating may have a substantially consistent thickness respective to surface. Alternatively, coating may be applied to surface intermittently and/or in a specific pattern. Additionally, coating may be applied to surface only on desired portions of surface, such as, for example, portions of surface contacting or in close proximity to a seam, hole, interstice, or other opening defined in surface or adjacent to surface, or interior or exterior surface portions. Coating may comprise an ultra-thin transparent layer, enabling coating to be formed on surface with little to no impact on functionality or aesthetics of article.

Suitable substrate materials that may be treated include, for example, synthetic polymers, such as acrylics, nylons, polyesters, Kevlar™, Nomex™, polyolefins (polyethylenes, polypropylene, and other polyolefins), polycarbonates, polystyrenes, and copolymers of these with each other and with other monomers. Also included are blends of any of these materials in the same substrate, or composites of these materials with fibers or other materials, such as carbon fiber composites. Also contemplated are natural materials such as vegetable fibers or materials (e.g., cellulosic, ligneous, cotton, hemp), animal fibers or materials (e.g. wool, hair, silk, feather, leather), minerals, ceramics, metals. Suitable materials also include wood, paper, plaster, glass, silicon, composite materials, silicon-based materials, semiconducting materials, and insulating materials. The surfaces may be coated directly upon a substrate material, or upon another suitable coating or film that is applied over the substrate (such as transparent plastic films for windshields or opaque films for waterproof surfaces). The materials can be in any suitable form, such as fiber, yarn, bulk cloth, film, sheet, or bulk form. The coating can be applied in a batch or continuous process.

Plasma Treatment of the Substrate:

The substrate is plasma treated to remove organic contamination and increase the number density of reactive sites on the surface. The plasma treatment may be either an air plasma, oxygen plasma, or a carbon dioxide plasma or equivalent.

The carbon dioxide plasma is intended to increase the number density of carboxyl, —COOH, groups on the surface. Advantageously, the carbon dioxide plasma may also increase the number of carbonyl (C=O) groups on the surface. This can be achieved by using a $CO_2$ plasma, a mixture of $CO_2$ and $H_2O$, a mixture of $CO_2$ and $H_2$, a mixture of $CO_2$ and $O_2$ or a mixture of $CO_2$, $H_2$, $O_2$ and $H_2O$. The highest number density of —COOH groups is achieved by adjusting different variables such as plasma power which can be anywhere between 1 W-5000 W, plasma treatment time, plasma treatment temperature which can be from $-100°$ C.-600° C. and plasma gas pressure. Other materials that might add carboxyl groups to a surface during plasma treatment include carbon monoxide (CO), formic acid, acetic acid, trifluoroacetic acid, oxalic acid, oxalyl chloride, etc.

Oxygen and/or air plasmas may also introduce reactive functional groups on polymer surfaces, including but not limited to, carboxyl and carbonyl groups.

The substrate may comprise any material or combination of materials suitable for deposition of a silane compound. Examples of materials suitable for forming substrate include the materials listed above.

A suitable substrate includes materials that can react with the plasma to form binding groups, such as carboxyl groups, on the surface.

With respect to carboxyl groups, without being bound to any theory, it is believed that superior properties derive from a high- or higher-density of carboxyl groups, or even carbonyl groups, covalently bound to the surface of the substrate. These carboxyl, or carbonyl groups may form covalent linkages with amine groups in the first silane, or may simply interact via acid-base interactions. This occurs from the acid/base interaction of carboxyl groups and amine groups, which forms a covalent bond upon thermally-induced dehydration. These covalent linkages firmly attach the first silane to the surface, which in turn presents a robust, and adherent coating and presents a dense surface of reactive groups for attachment of the second silane. Carbonyl groups may also react with amine groups, especially when either the carbonyl or amine group is on an aryl moiety.

The result is that coatings using first silanes with amine groups create coatings with excellent properties, as demonstrated by data shown in the examples. In addition, the data shows that the combination of a carboxyl- (or carbonyl-) group producing plasma treatment and use of amino-containing first silanes appears to have a synergistic effect in producing coatings with improved properties.

As described below, the second silane to be chosen is to apply a hydrophobic property to the surface. An article that may require treatment of its entire or a part of its surface. Other second silanes that would impart other properties to the surface are also contemplated.

FIG. 1 illustrates an exemplary article 20 comprising a substrate 22 and a coating 26. Substrate 22 may comprise a surface 24. Coating 26 may comprise an adhesion promoting layer 28 and a hydrophobic layer 30. Article 20 may comprise any suitable article or device having a surface portion. Examples of article 20 may include, without limitation, any of those listed above, and also include electronic devices, silicon wafers, silicon chips, ink jet cartridges, plastic films, batteries, battery contacts, rechargeable batteries, mesh coverings, ear pieces, and components of the foregoing. Article 20 may also comprise surfaces formed in any shape, size, texture, or configuration, including, for example, planar surfaces, curved surfaces, rough surfaces, smooth surfaces, and/or irregular surfaces. Additionally, article 20 may include various hearing aid devices, components, and/or accessories, including, for example, shell components, covers, in-the-ear domes (e.g., for open ear products), microphone covers (e.g., fabric mesh covers), volume controllers, switches, buttons, microphone ports, receiver ports, tubing, ear hooks, acoustic damping elements, battery doors, batteries, battery contacts, nozzles, DAI connectors, moisture and/or wax guards, face plate elements, ear molds (e.g., for standard ear molds and custom ear molds), and any other hearing aid device or component.

FIG. 2 illustrates a textile article 83, comprising fibers 81, and yarns 82. To impart a hydrophobic surface to this article, the article, whether woven, knit, or non-woven, may be treated, or either the fibers or the yarns may be treated before manufacture of the woven, knit, or non-woven article.

FIG. 3 shows an exemplary portable electronic device (cell phone). Hydrophobic surfaces may be applied to, for example, to casing 1, front case 11, rear case 12, display screen 13, or keys 14, 15. Coatings may be selectively applied near the joints between 11 and 12, near holes and openings in the case, such as near openings for keys 14, 15. Other portable electronic devices, such as, PDAs, music players, media recorders and players, portable computers, and the like.

Optional Hydration of the Substrate

Optionally the plasma treated substrate can be hydrated with water vapor to further increase the bonding with the First Silane. Optionally, the substrate may also be hydrated with water vapor prior to deposition of the first silane.

Deposition of First Silane:

The surface of the plasma-cleaned substrate is exposed to an amino silane, which is a silane with at least one amine group. The first or amino silane acts as an adhesion promoter for second silane. This silane could be any silane having an amine group. This amine group could be on an alkyl or aryl moiety. The substrate surface is exposed to the amino silane by any suitable system, such as vapor deposition systems.

In an aspect the first silane has at least one silane group. In an exemplary embodiment, the silane group on the first silane may be represented by formula (I):

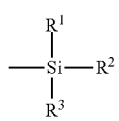

where $R^1$, $R^2$, and $R^3$ may each be, independently, F, Cl, Br, I, H, OH, a methoxy group, an ethoxy group, an isopropoxy group, an alkoxy group, an acetoxy group, a methyl group, an alkyl group, an aryl group, a perfluoroalkyl group, a partially fluorinated alkyl group, a dimethylamino group, a dialkylamino group, an ethylamino group, a monoalkylamino group, an amino group, a phenyl group, or a methoxyethoxyethoxy group. The other group on the silane, which is not $R^1$, $R^2$, or $R^3$, and is directed to the left of the silicon, could be any chemical moiety that gives desired amino functionality to the silane molecule.

In an aspect, first silane may be represented by formula (II):

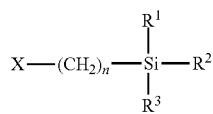

where X is an amino group. In formula (II), n may be an integer from 0-32. In additional embodiments, n may be an integer from 1-18. In at least one embodiment, n may be an integer from 3-4. Additionally, in formula (II), $R^1$, $R^2$, and $R^3$ may be as defined above for formula (I).

In certain embodiments, the first silane may also be represented as formula (III):

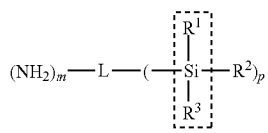

where L is any suitable group to attach the amine(s) and the silane(s). L may be branched or straight, alkyl or aryl, and p and m may independently be 1 or greater than 1. There may also be more than one amine group in the molecule, where these amine groups may be primary, secondary, or tertiary. $R^1$, $R^2$, and $R^3$ may be as defined above for formula (I).

A suitable first silane is any compound that has amine groups that may interact with any surface carboxyl or carbonyl groups or other amine-reactive groups, and will interact favorably with the second silane. The L group may be any suitable group that does not interact or interfere with the attachment to the substrate or the second silane, or materially affect the properties of the surface, such as through chemical reactions, stereo interference, or the like. Suitable L groups, one or a combination of straight or branched carbon chains, optionally containing all kinds of possible atoms.

Examples of the first silane include, but are not limited to 4-aminobutyltriethoxysilane, 1-amino-2-(dimethylethoxysilyl)propane, n-(2-aminoethyl)-3-aminoisobutyldimethylmethoxysilane, n-(2-aminoctyl)-3-aminoisobutylmethyldimethoxysilane, (aminoethylaminomethyl)phenethyltrimethoxysilane,n-(2-aminoethyl)-3-aminopropylmethyldimethoxysilane, n-(2-aminoethyl)-3-aminopropyltriethoxysilane, n-(2-aminoethyl)-3-aminopropyltrimethoxysilane,n-(6-aminohexyl)aminopropyl-trimethoxysilane,n-(2-aminoethyl)-11-aminoundecyltrimethoxysilane, 3-(m-aminophenoxy)propyltrimethoxysilane, m-aminophenyltrimethoxysilane, p-aminophenyltrimethoxysilane, n-3-[(amino(polypropylenoxy)]aminopropyltrimethoxysilane, 3-aminopropyldiisopropylethoxysilane, 3-aminopropylmethylbis(trimethylsiloxy)silane, 3-aminopropyldimethylethoxysilane, 3-aminopropylmethyldiethoxysilane, 3-aminopropylpentamethyldisiloxane, 3-aminopropyltris(methoxyethoxyethoxy)silane, 3-aminopropyltris(trimethylsiloxy)silane, 11-aminoundecyltriehoxysilane, 3-aminopropyltrimethoxysilane and 3-aminopropyltriethoxysilane.

Hydrolysis:

The surface treated with the first silane is exposed to water vapors to hydrolyze —Si(OR)$_3$ groups, or other hydrolyzable groups such as Si—Cl, of the attached amino silane to —Si(OH)$_3$ groups, which makes the surface more reactive towards the second silane.

The hydrolysis may be by any suitable system, such as exposing the surface to moisture.

Deposition of Second Silane:

After exposure to water vapors, the surface is treated with a second silane to impart a surface with desired properties. The second silane may be any second silane as disclosed in U.S. patent application Ser. No. 11/866,897.

A second silane is deposited upon and bonded to the adhesion promoting layer. The second silane is often chosen to provide an outer layer with a hydrophobic surface. The second silane may also be chosen to provide other properties to the surface, such an oleophobic surface or a hydrophobic/oleophobic surface, or even a hydrophilic surface. As an example, the hydrophobic layer may comprise a second silane having at least one perfluorinated aliphatic group. The hydrophobic layer may also comprise additional compounds in addition to the second silane. The additional compounds in hydrophobic layer may impart various desirable properties to hydrophobic layer, such as, for example, microbial resistance, without preventing the hydrophobicity of the hydrophobic layer and/or the second silane from acting as a hydrophobic and/or oleophobic layer or compound.

In order to impart hydrophobic characteristics to the coating, the second silane may comprise long alkyl chains, partially fluorinated alkyl chains, and/or alkyl chains that have regions that are perfluorinated, any of which may be straight or branched. The second silane may contain aryl groups. For example, the second silane may comprise alkyl chains having the general formulas $CF_3(CF_2)_n(CH_2)_mSiR^1R^2R^3$ and/or $CF_2H(CF_2)_n(CH_2)_mSiR^1R^2R^3$, where n and m are integers (n greater than or equal to 0, and m greater than or equal to 0). In addition, the second silane and/or the hydrophobic layer may comprise mixtures of alkyl, perfluoroalkyl, or partially fluorinated alkyl chains.

The second silane may be capable of bonding to the first silane through, for example, a siloxane (Si—O—Si) linkage. Additionally, the second silane may be capable of forming polymers containing siloxane linkages. In an exemplary embodiment, the silane group on the second silane may be represented by formula (III):

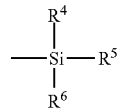

where $R^4$, $R^5$, and $R^6$ may each be, independently, F, Cl, Br, I, H, OH, a methoxy group, an ethoxy group, an isopropoxy group, an alkoxy group, an acetoxy group, a methyl group, an alkyl group, a perfluoroalkyl group, a partially fluorinated alkyl group, a dimethylamino group, a dialkylamino group, an ethylamino group, a monoalkylamino group, an amino group, a phenyl group, or a methoxyethoxyethoxy group.

In at least one embodiment, the second silane may be represented by formula (IV):

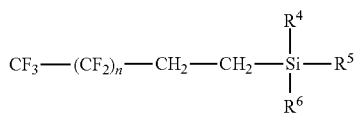

where n may be an integer from 0-32, and $R^4$, $R^5$, and $R^6$ may be as defined above for formula (III). In additional embodiments, n may be an integer from 1-16. In at least one embodiment, n may be an integer from 5-9.

Representative examples of the second silane include, without limitation, (tridecafluoro-1,1,2,2-tetrahydrooctyl)trichlorosilane, (tridecafluoro-1,1,2,2-tetrahydrooctyl)methyldichlorosilane, (tridecafluoro-1,1,2,2-tetrahydrooctyl)trimethoxysilane, (tridecafluoro-1,1,2,2-tetrahydrooctyl)triethoxysilane, (tris(tridecafluoro 1,1,2,2-tetrahydrooctyl) dimethylsiloxy)chlorosilane, (heptadecafluoro-1,1,2,2-tetrahydrodecyl)trichlorosilane, triethoxy(1H,1H,2H,2H-perfluorooctyl)silane, (heptadecafluoro-1,1,2,2-tetrahydrodecyl)triethoxysilane, (heptadecafluoro-1,1,2,2-tetrahydrodecyl)trimethoxysilane, (heptadecafluoro-1,1,2,2-tetrahydrodecyl)methyldichlorosilane, (heptadecafluoro-1,1,2,2-tetrahydrodecyl)dimethylchlorosilane, perfluorododecyl-1H,1H,2H,2H-triethoxysilane-perfluorotetradecyl-1H,1H,2H-,2H-triethoxysilane mixture, 1,8-bis(trichlorosilylethyl)hexadecylfluorooctane, n-octadecyldimethylchlorosilane, n-octadecyldimethylmethoxysilane, n-octadecylmethoxydichlorosilane, n-octadecylmethyldichlorosilane, n-octadecylmethoxydichlorosilane, n-octadecylmethyldiethoxysilane, n-octadecyltrichlorosilane, n-octadecyltriethoxysilane, n-octadecyltrimethoxysilane, n-octadecyldimethyl(dimethylamino)silane, n-triacontyldimethylchlorosilane, n-triacontyltrichlorosilane, n-hexadecyltrichlorosilane, n-hexadecyltrimethoxysilane, n-hexadecyltriethoxysilane, n-dodecyltrichlorosilane, n-dodecyltrimethoxysilane, n-dodecyltriethoxysilane, n-dodecylmethyldichlorosilane, n-octyltrichlorosilane, n-octyltrimethoxysilane, n-octyltriethoxysilane, n-octylmethyldichlorosilane, and n-octyldimethylchliorosilane. The second silane may also include compounds according to the general formula $CH_3(CH_2)_n CHRCH_2SiCl_3$, where $R=CH_3(CH_2)_m$, and n and m are integers (n greater than or equal to 0, and m equal to or greater than 0). The second silane may also include compounds according to the general formula $CH_3(CH_2)_n CHRSiCl_3$, where $R=CH_3(CH_2)_m$, and n and m are integers (n greater than or equal to 0, and m greater than or equal to 0). The second silane may also include compounds according to the general formula $CH_3(CH_2)_n CHRSi(OCH_3)_3$, where $R=CH_3(CH_2)_m$, and n and m are integers (n greater than or equal to 0, and m greater than or equal to 0).

In certain embodiments, the adhesion promoting layer and the hydrophobic layer may comprise a germanium compound (e.g., a germane) in addition to or in place of a silane compound. Germanium compounds may function as adhesion promoting and hydrophobic compositions in a manner similar to analogous silicon compounds. Accordingly, silicon compounds listed above as examples of the first silane or the second silane may be substituted with analogous germanium compounds, in which the Si atom is replaced with a Ge atom.

A mixture of silanes could be employed in the second silane deposition. For example, a silane with a perfluorinated tail and a silane containing an alkyl chain could be jointly deposited in this manner.

Use of a Cross-Linker:

The abrasion resistance of the coating can be further improved by using a cross-linker.

This cross-linker can be used in the following ways:
1) Deposition of a mixture of the cross-linker and the first amino silane;
2) Deposition of the cross-linker after deposition of the amino silane;
3) Deposition of a mixture of a cross-linker and an second silane;
4) Deposition of the cross-linker after deposition of the second silane.

The mixtures of the amino silane and cross-linker, and second silane and cross-linker may have any percentage of cross-linker in them. The use of this reagent will cross-link deposited aminosilane and/or second silane coatings, which will make them even more robust and hence more abrasion resistant. A variety of cross-linkers can be used for this purpose, e.g., diisocyanates, which have a general formula OCN—R—NCO, diacidchlorides, which have a general formula ClOC—R—COCl, diesters, e.g., dimethyl and diethyl esters, which have a general formula $CH_3COO$—R—$COOCH_3$ or $C_2H_5COO$—R—$COOC_2H_5$, where R is a carbon chain containing all kinds of possible atoms in it. Silanes can also be used as a cross-linker. These silanes have a general formula $(RO)_3$—Si-L-Si$(OR)_3$, $(RO)_2CH_3$—Si-L-Si—$CH_3(OR)_2$ or $RO(CH_3)_2$—Si-L-Si—$(CH_3)_2$—OR, where R may be $C_2H_5$, $CH_3$ and L may be a carbon chain, such as an alkyl or aryl group, containing all kinds of possible atoms in it. Instead of alkoxy groups (—OR), one might also use chloro or acetoxy reactive groups on the silanes, or any other silane with a suitable reactive functional group. Other examples of possible cross-linkers are glycidoxypropyltrimethoxysilane and glutaraldehyde.

BRIEF DESCRIPTION OF DRAWINGS

FIG. 5 is a chart use for determining standard spray test ratings.

DETAILED DESCRIPTION

Examples

Figure 1:
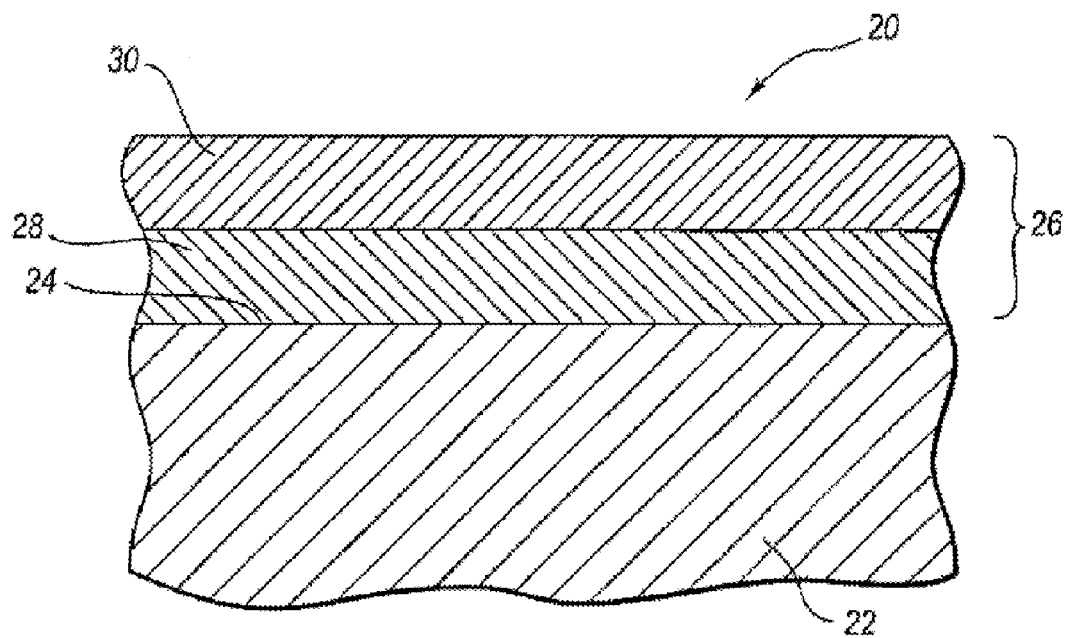
FIG. 1 is a schematic cross-section of the coated article.
Figure 2:
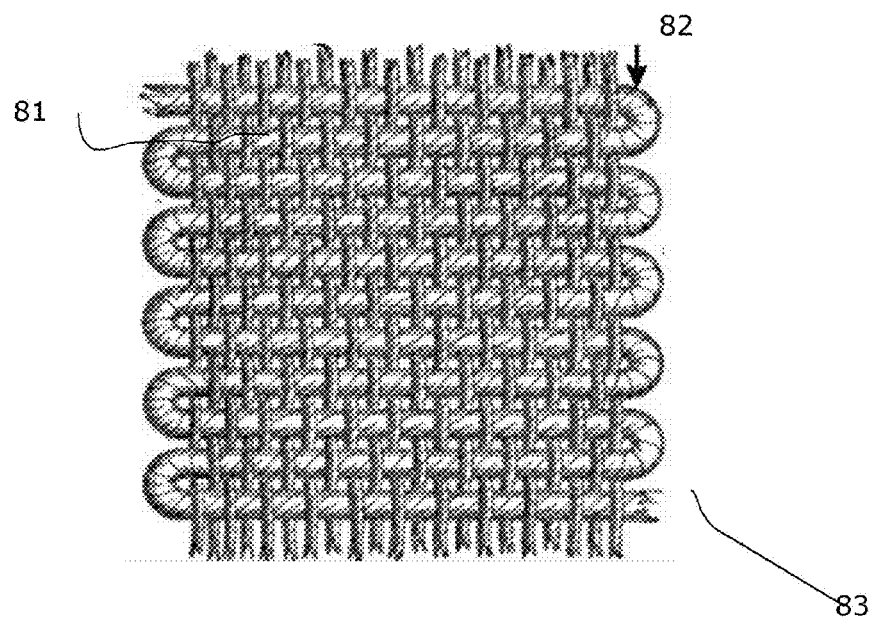
FIG. 2 a schematic view of a coated article.
Figure 3:
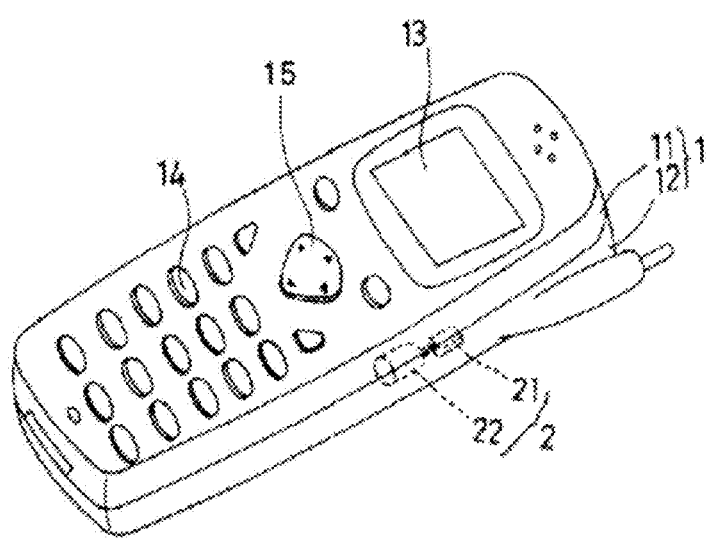
FIG. 3 a schematic view of a coated article.

The following procedure was essentially adhered to in the Examples that follow:

The applicability of the process was demonstrated by coating a nylon and polyester fabric. The process was done in a commercially-available plasma system: the chemical vapor deposition system YES-1224P from Yield Engineering Systems, California. The entire process was done at 100° C. and involved the following steps:

Plasma Cleaning/Treatment of Nylon and Polyester Substrate

The plasma cleaning/treatment of the substrate was performed in a $CO_2$ or oxygen plasma. A total of four plates (two active plates and two ground plates) were employed, and the voltage was applied to the active plates for plasma generation. These plates were arranged in the order: active, ground, ground and active (AGGA) from top to bottom. The fabric was placed on the third plate from the top (the lower ground plate). The fabric was plasma treated at 100 W for 2.5 minutes.

Deposition of First Silane

After the plasma treatment, 1 mL of 3-aminopropyltrimethoxysilane was injected into the chamber. A reaction/surface adsorption was allowed to take place for 20 minutes. After the reaction, the unreacted silane was pumped out of the chamber.

Hydrolysis of Amino-Silane Functionalized Nylon and Polyester Substrates

Amino silane functionalized fabric was then exposed to water vapors by injecting 1 mL of water into the chamber. This hydrolysis was for 20 minutes. This treatment is believed to hydrolyze —Si(OR)$_3$ groups of the amino silane to —Si(OH)$_3$ groups, and hence make the surface more reactive towards the attachment of second silane. After the reaction, unreacted water was pumped out of the chamber.

Deposition of the Second Silane

In the final step, 1 mL of (tridecafluoro-1,1,2,2-tetrahydrooctyl)trimethoxysilane was injected into the chamber. This deposition was for 20 minutes. The unreacted silane was pumped out of the chamber after the reaction.

Comparative tests were run using a $CO_2$ plasma, an $O_2$ plasma, or an air plasma, and using an amine terminated first silane and a first silane/adhesion promoter that is not amine terminated.

Example 1

A comparative test was conducted which involves the use of 3-isocyanatopropyl triethoxysilane as the first silane or adhesion promoter in the treatment of a nylon surface. The process used an air plasma to oxidize the surface. The second silane, (tridecafluoro-1,1,2,2-tetrahydrooctyl)trimethoxysilane, was bonded to the first silane in an attempt to make the surface hydrophobic. However it was found the surface did not become hydrophobic after the deposition. In another comparative experiment, chemical vapor deposition was performed on nylon without using the isocyanato silane adhesion promoter, where the remaining process was the same. The surface did not become hydrophobic. It was observed that (tridecafluoro-1,1,2,2-tetrahydrooctyl)trimethoxysilane does not adhere well to the nylon surface. The process was also applied to a polyethylene substrate and it was observed that the surface did not become hydrophobic. In summary, whether with or without the isocyanato adhesion promotion agent, the air plasma treated surface did not become hydrophobic when treated with the hydrophobic silane ((tridecafluoro-1,1,2,2-tetrahydrooctyl)trimethoxysilane).

Example 2

In the next set of experiments an amine-terminated first silane, 3-aminopropyl trimethoxy silane (APTMS) or 3-aminopropyl triethoxysilane (APTES), was used as an adhesion promoter instead of 3-isocyanatopropyl triethoxysilane used in Example 1. Use of either of these two amine terminated silanes resulted in nylon and polyethylene that were super hydrophobic. It was found that APTES and APTMS adhered well to all the surfaces tested, i.e., use of these silanes as the adhesion promoter in the process makes the surface hydrophobic.

Example 3

A nylon swatch having a hydrophobic coating was made by the same chemical vapor deposition (CVD) process as in Example 2, but using an oxygen plasma. The first and second silanes were APTMS, and (tridecafluoro-1,1,2,2-tetrahydrooctyl)trimethoxysilane, respectively. The coated surfaces were tested for abrasion resistance by employing the following standard: ASTM D4966-98 (Martindale abrasion tester.) The coating came off the surface in less than 100 cycles.

Example 4

The process of Example 3 was repeated, but the oxygen plasma was replaced with carbon dioxide plasma. The hydrophobic coating lasted at least 1700 cycles in the abrasion test. From this it can be concluded that use of a carbon dioxide plasma helped significantly improve the abrasion resistance of the coating as noted above in similar samples.

Example 5

An Apple iPod was also coated using the process of Example 4. CVD was done at 60° C. The process used a $CO_2$ plasma, APTMS was the adhesion promoter. Treatment by the plasma and application of the APTMS, was followed by hydrolysis and application of (tridecafluoro-1,1,2,2-tetrahydrooctyl)trimethoxysilane. To test hydrophobicity, water contact angles were measured. Water contact angles may be used as a measure of surface hydrophobicity. A higher water contact angle for a surface may indicate that the surface has a higher degree of hydrophobicity.

The water contact angles of the front (screen) and back (body) were 117±2 degrees and 113±7 degrees.

Example 6

A comparative set of tests were conducted, comparing carbon dioxide plasma with oxygen plasma treatment, and comparing 3-aminopropyltrimethoxysilane (APTMS) and 3-isocyanatopropyltriethoxysilane (ICPTES) for the first silane. Samples were produced by treating pieces of polyester fabric as a substrate essentially as described above. All tests were done with 20 minute depositions of each silane, and a 20 minute hydrolysis step. The temperature of the reaction was 100° C.

Figure 4:
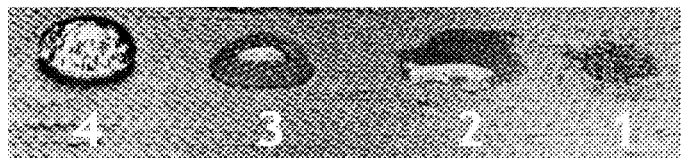
FIG. 4 is a chart showing wetting test parameters for determining water repellency.

To test hydrophobicity of the samples, wetting tests similar to the Dupont Water prop Test LS & CO Method 42 were conducted with water/isopropylalcohol (IPA) mixtures. For example, 98/2 means a mixture of 98% water and 2% IPA. The results of the test are shown in Table 1. See FIG. 4 for a description of test results listed. (In short, a score of "4" means passing, a score of "1" represents complete failure.)

In addition, water spray tests were performed in accordance with the AATCC Test Method 22-2005, Water Repellency: Spray Test. The spray patterns were evaluated by comparison to a rating chart, which is shown in FIG. 5, and with reference to Table 2. The results are shown in Table 1.

TABLE 1

Initial Wetting and Spray Tests After Treatment

| Sample | Wetting test 100/0 | Wetting test 98/2 | Wetting test 95/5 | Wetting test 90/10 | Wetting test 80/20 | Wetting test 70/30 | Wetting test 60/40 | Wetting test 50/50 | Wetting test 40/60 | Spray Test |
|---|---|---|---|---|---|---|---|---|---|---|
| $CO_2$/APTMS | 4 | 4 | 4 | 4 | 4 | 4 | 4 | 3.5 | 2 | 100 |
| $O_2$/APTMS | 4 | 4 | 4 | 4 | 4 | 4 | 3.7 | 3 | 1 | 100 |
| $CO_2$/ICPTES | 4 | 2 | 1 | 1 | 1 | 1 | 1 | 1 | 1 | 60 |
| $O_2$/ICPTES | 4 | 3 | 2 | 1 | 1 | 1 | 1 | 1 | 1 | 65 |

TABLE 2

Spray Test Evaluation

| Rating | Evaluation |
|---|---|
| 100 | No sticking or wetting of upper surface |
| 90 | Slight random sticking or wetting of upper surface |
| 80 | Wetting of upper surface at spray points |
| 70 | Partial wetting of whole of upper surface |
| 50 | Complete wetting of whole of upper surface |
| 0 | Complete wetting of whole upper and lower surfaces |

With reference to Table 1, in instances where APTMS was used, there is a marked improvement in hydrophobicity as indicated by the wetting tests and the spray tests. Comparing the oxygen/ICPTES data with the carbon dioxide/ICPTES data there is small decrease in hydrophobicity when carbon dioxide plasma treatment is used, which may suggest that the oxygen plasma leads to the introduction of more —OH groups on the plasma treated surface while the carbon dioxide plasma leads to the introduction of more carboxyl groups on the plasma treated surface.

For the carbon dioxide plasma treatment, there is a marked degradation when ICPTES is used as the first silane. Unexpectedly, when the carbon dioxide plasma was used with the APTMS first silane there was a marked improvement, as shown by both the wetting test results and the spray test results. This indicates that there may be a synergistic interaction between the carbon dioxide treated surface and the first silane APTMS as it bonds to the surface.

Example 7

Samples of polyester cloth were prepared and treated essentially as above with $CO_2$ plasma and $O_2$ plasma using APTMS as the first silane. A washing test was accomplished by sewing the samples to a larger cloth and washing the cloth several times in a standard washing machine. Along with this sample of cloth, ballast materials were present in the washing machine to simulate a wash in a real washing machine cycle, similar to AATCC "Standardization of Home Laundry Test Conditions." After a set number of wash cycles the samples were tested with the wetting test and spray test as described in Example 6. The data collected is located below in Table 3.

TABLE 3

Samples v. Washing

| Sample | # of WASHES | Wetting test 98/2 | Wetting test 95/5 | Wetting test 90/10 | Wetting test 80/20 | Wetting test 70/30 | Wetting test 60/40 | Wetting test 50/50 | Wetting test 40/60 | Spray Test |
|---|---|---|---|---|---|---|---|---|---|---|
| $CO_2$/APTMS | 0 | 4 | 4 | 4 | 4 | 4 | 4 | 3.5 | 2 | 100 |
| $CO_2$/APTMS | 1 | 4 | 4 | 4 | 4 | 4 | 2.7 | 1 | 1 | 100 |
| $CO_2$/APTMS | 5 | 4 | 4 | 4 | 4 | 2 | 1 | 1 | 1 | 90 |
| $CO_2$/APTMS | 10 | 4 | 4 | 4 | 4 | 1 | 1 | 1 | 1 | 85 |
| $CO_2$/APTMS | 15 | 4 | 4 | 4 | 4 | 1 | 1 | 1 | 1 | 85 |
| $CO_2$/APTMS | 20 | 4 | 4 | 4 | 2 | 1 | 1 | 1 | 1 | 80 |
| $CO_2$/APTMS | 25 | 4 | 4 | 4 | 1 | 1 | 1 | 1 | 1 | 75 |
| $O_2$/APTMS | 0 | 4 | 4 | 4 | 4 | 4 | 3.7 | 3 | 1 | 100 |
| $O_2$/APTMS | 1 | 4 | 4 | 4 | 4 | 3.3 | 1 | 1 | 1 | 100 |
| $O_2$/APTMS | 5 | 4 | 4 | 4 | 4 | 1 | 1 | 1 | 1 | 95 |
| $O_2$/APTMS | 10 | 4 | 4 | 4 | 2 | 1 | 1 | 1 | 1 | 85 |
| $O_2$/APTMS | 15 | 4 | 4 | 4 | 3.7 | 1 | 1 | 1 | 1 | 85 |
| $O_2$/APTMS | 20 | 4 | 4 | 4 | 2 | 1 | 1 | 1 | 1 | 80 |
| $O_2$/APTMS | 25 | 4 | 4 | 4 | 1 | 1 | 1 | 1 | 1 | 80 |

As shown by data contained in Table 1 and Table 3 above, the $CO_2$/APTMS and $O_2$/APTMS samples show superior hydrophobicity and durability as compared to the $CO_2$/ICPTES and $O_2$/ICPTES samples.

Figure 6:
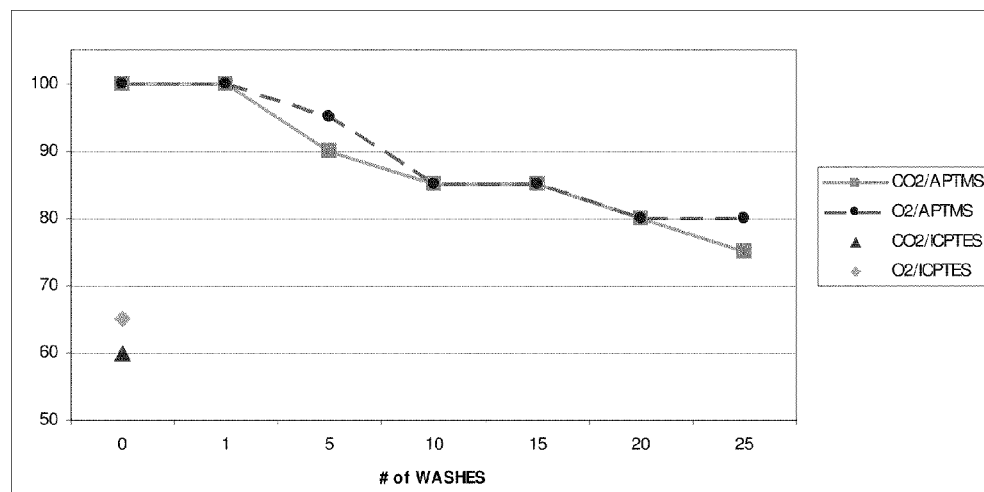
FIG. 6 is a graph showing wetting test data.

In FIG. 6 is a graphical representation of data the wetting test data contained in Table 3 above.

Example 8

All samples described in Example 6 and Example 7 above were subjected to a Martindale Abrasion Test following standard ASTM D4966-98. The results are listed below in Table 4.

TABLE 4

Treated Samples vs Martindale Abrasion Test

| Sample | # of Martindale Abrasion cycles before wetting by water |
|---|---|
| $CO_2$/APTMS* | 5000+ |
| $O_2$/APTMS* | 5000+ |
| $CO_2$/ICPTES | 400 |
| $O_2$/ICPTES | 1200 |

Description: Water was used to test the hydrophobicity of the surfaces
*90/10 ($H_2O$/IPA) solution does not wet the surfaces even after 5000 abrasion cycles As these results indicate, the combinations of O2/APTMS and CO2/APTMS performed significantly better when subjected to the Martindale Abrasion Test.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A method comprising;
treating a polymeric surface with plasma;
exposing the treated surface in the vapor phase to an adhesion promoting compound, the adhesion promoting compound having at least one silane functional group and at least one amine group to form an amino silane coated surface;
attaching an alkoxy silane selected from one or more of methoxy and ethoxy silanes by reacting the alkoxy silane in the vapor phase with the amino silane coated surface to form a hydrophobic outer surface, the alkoxy silane having at least one terminal —$CF_3$ group and at least 3 —$CF_2$— groups, and at least one —$CH_2$—$CH_2$— group.

* * * * *